Jan. 6, 1959    A. MENDEZ    2,867,206
PORTABLE HEATER AND COOKER
Filed Jan. 7, 1955    2 Sheets-Sheet 1
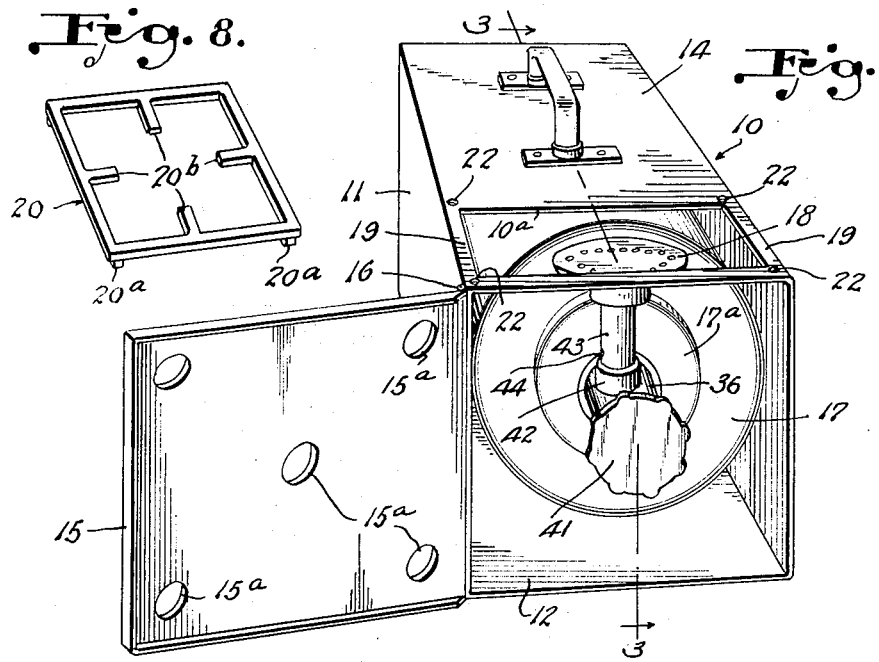
INVENTOR
Alfredo Mendez
BY Eugene E. Kerns
ATTORNEY Jan. 6, 1959
A. MENDEZ
2,867,206
PORTABLE HEATER AND COOKER
Filed Jan. 7, 1955
2 Sheets-Sheet 2
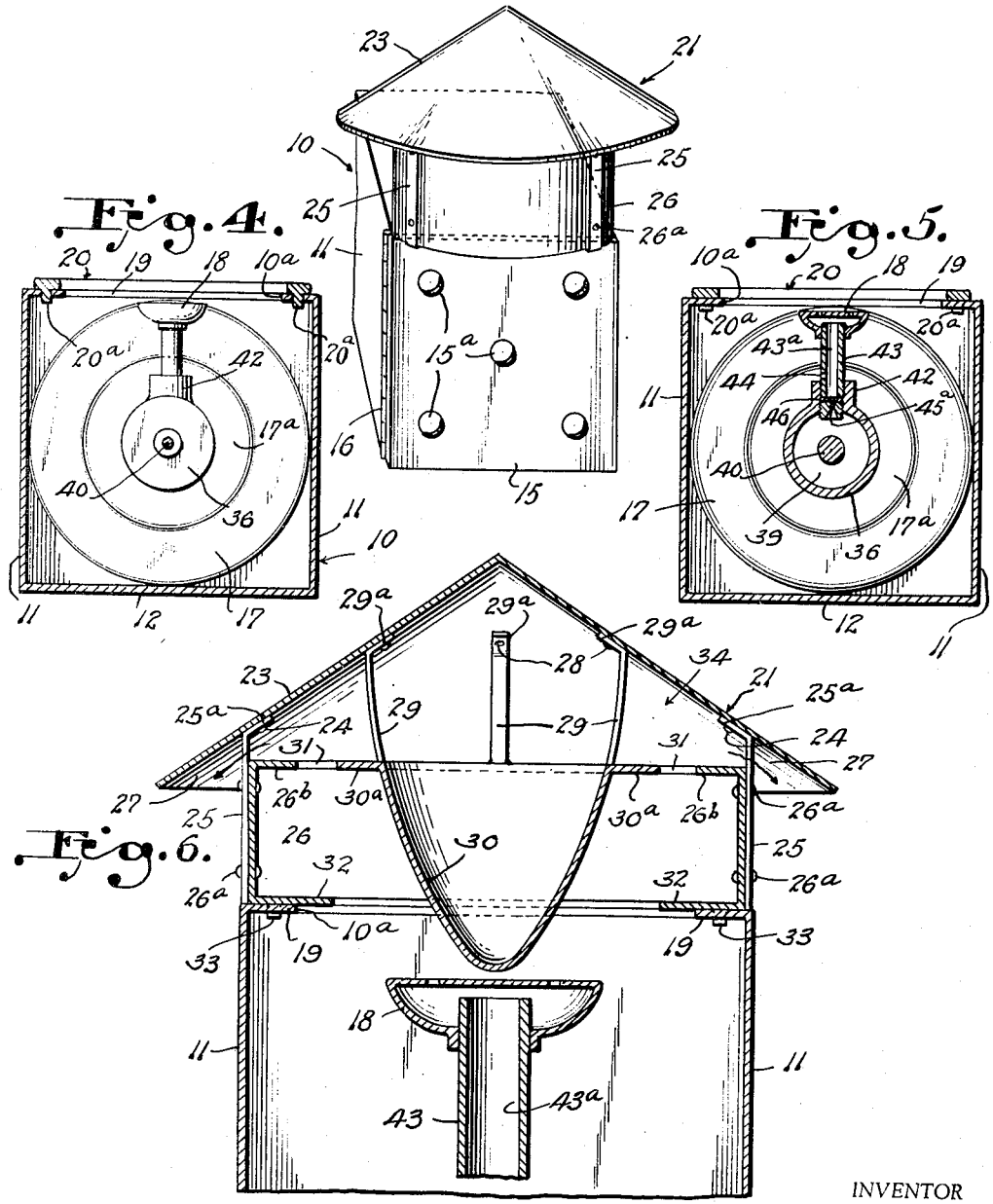
INVENTOR
Alfredo Mendez.
BY
ATTORNEY

United States Patent Office 2,867,206
Patented Jan. 6, 1959

2,867,206
PORTABLE HEATER AND COOKER
Alfredo Mendez, Chicago, Ill.

Application January 7, 1955, Serial No. 480,579

3 Claims. (Cl. 126—38)

My invention relates to improvements in portable stoves and is particularly suited for use by sportsmen on hunting or fishing trips, not only for cooking purposes, but also for heating tents or small enclosures.

One of the primary objects of the invention is to provide a device as characterized, which will use as fuel butane, propane or other of the more volatile cuts of petroleum which are gaseous at atmospheric pressure but which liquify under pressures exceeding atmospheric pressures.

It is also an object of the invention to provide a device of this kind which is simple in construction, substantially foolproof and highly efficient in operation, and which involves novel control valve-incorporating means which eliminates the necessity for a pressure regulator, which is ordinarily required in burners or the like using propane or equivalent gas as fuel.

Another aim of the invention is to provide a combined cooker and heating unit involving novel means for selectively supporting a vessel-supporting grid and warm air-diffuser unit in operative relationship to a burner.

The invention also contemplates a portable vapor fuel burning stove wherein a burner-supporting fuel tank and a carrier housing therefor cooperate to provide implement receiving compartments; and wherein the tank and housing are retained assembled by frictional engagement of wall portions thereof.

Various other objects and advantages of the invention will be apparent to those versed in the art upon reference to the accompanying drawings in connection with the detailed description thereof appearing hereinafter.

It is to be understood, however, that the particular example of the invention referred to herein is to be taken as illustrative rather than limitative since it will be obvious that my inventive concept is susceptible of other mechanical expressions within the spirit and scope of the subject matter claimed hereinafter.

In the drawings, wherein the same reference characters have been used to designate the same parts throughout the several views—

Figure 1 is a perspective view of the device illustrating a vessel-supporting grid in operative relationship to the burner, the ventilating door at the burner end being shown open;

Figure 2 is a fragmentary perspective illustrating the disposition of an air-diffusing member in relationship to the burner when the device is used as a heater;

Figure 3 is a sectional view taken on the line 3—3 of Figure 1, and showing the burner unit in longitudinal section and illustrating also the means for securing the vessel-supporting grid in place;

Figure 4 is a sectional view taken on the line 4—4 of Figure 3;

Figure 5 is a sectional view taken on the line 5—5 of Fig. 3;

Figure 6 is a central vertical section through the air-diffusing heater, and adjacent parts;

Figure 7 is a top plan view of the casing of Fig. 1; and
Figure 8 is a perspective of the grid.

Referring to the drawings by reference characters, and turning to Figure 1, number 10 designates a rectangular casing or housing having side walls 11, bottom wall 12, rear wall 13 and top wall 14, there being a ventilating door 15 at the forward end of the casing for insertion of the fuel tank 17. The ventilating door 15 is hinged to one of the side walls 11, as indicated at 16, and such door is shown provided with ventilating openings 15a.

It is to be noted that the top wall 14 terminates substantially short of the forward end of the casing 10, so as to provide an open space above the burner 18 which latter is carried by the fuel tank 17, as will be explained presently.

Figures 1 and 3 show the top casing opening 10a above the burner is provided at its sides and forward end with marginal supporting flanges 19 which cooperate with the adjacent end of top wall 14 to sustain a heat user support such as the grid frame 20 or the frame 26 of the warm air-diffuser or heater 21 of Figure 2.

The frame of the grid 20 conforms generally to the shape of the opening 10a and each corner has a fixedly carried depending pin 20a adapted to be received in appropriate holes 22 in the flanges 19 and in the forward end of the top wall 14, so as to retain the grid in place.

The grid 20 may be of any design and as shown has inwardly projecting vessel-supporting bars 20b which are carried by the marginal frame-defining portion.

Referring to the warm air-diffusing or heater element 21 of Figures 2 and 6, it will be seen that in the present instance the same comprises the broad and shallow conical top portion 23, which is secured as at 24 to the lug ends 25a of posts 25, which are carried by the circumferential collar 26 and secured thereto by rivets or the like 26a. The lug ends 25a of the posts 25 extend substantially above the top of the collar 26, and there is a circumferential air-exit space 27 between the top of the collar 26 and the adjacent surface of the conical member 23. The conical member 23 at its lower edge is of longer diameter than collar 26 and extends below the top of the latter so that warm air will be deflected diagonally downwardly from the annular space 27.

Secured as at 28 to the inner surface of the conical top portion 23 are the inturned feet portions 29a of legs 29, which carry the inverted and basically cone-form flame spreader 30, which is located above the burner element 18, as indicated in Fig. 6. The flame spreader 30 has the circumferential flange 30a adjacent the lower ends of its upwardly extending legs 29. This flange 30a is preferably substantially coplanar with but spaced from the inturned circumferential flange 26b at the upper end of the collar 26, so as to provide an annular inlet 31 into the warm air chamber which is defined by the conical top member 23 and the aforementioned flanges 26a, 30a. Flange 26b, as will be noted, protects the top securing means 24 from the flame when the latter is high.

The collar 26 also has the circumferential inwardly extending bottom flange 32, whose inner edge is spaced from the wall of the inverted flame spreader 30, as shown. Depending from this bottom flange 32 of the collar 26 are the pins 33 which are received in the holes 22 in the casing top and aforementioned flanges 19. Thus the warm air-diffuser is secured in place in the same fashion as is the vessel-supporting grid 20, previously mentioned.

It is a simple matter to replace one of the grid and warm air-diffuser members (20, 21) with the other, according to whether a space warmer or a cooker is desired at a particular time.

The ventilating openings or holes 15a in door 15 admit not only air to support combustion at the burner 18, but also cold air to be subsequently heated and discharged from the warm air chamber 34 above the flanges 26b, 30a through the annular space between the conical top member 23 and the subjacent collar 26.

Referring now to the fuel tank 17, burner 18, etc., previously referred to, it will be noted that the tank 17, is insertable through the door opening of the casing or housing 10, and that longitudinally coextensive intermediate side, bottom and top tank wall portions make a friction fit with opposed casing wall portions so that the tank is prevented from rocking in the casing or housing. The relative lengths of tank 17 and casing 10 are such that the rear wall acts as a tank end-engaging stop to provide a chamber 10x between the tank and the open end of the casing and to properly center the burner 18 with the top casing opening 10a. It is also to be noted that the opposed top, side and bottom walls of the housing 10 and tank 17 cooperate, as best shown in Fig. 4, to provide upper and lower implement-receiving compartments 10' at each side of housing 10 opening into the chamber 10x. These compartments 10' are useful for receiving knives, forks, and other utensils.

The forward end of tank 17 is provided with thickened and functionally integral head 17a which provides the tapped hole 35 to receive the threaded end 36a of a valve casing 36. The end 36a of the valve casing 36 provides the fuel inlet passage 37 which rigidly carries the fuel supply tube 38. This gas supply tube 38 extends into the tank 17 and turns upwardly to terminate at a point adjacent the upper part of the tank as illustrated in Fig. 3, in what will be a gas space above the liquid level as indicated.

The passage 37 terminates in the enlarged valve chamber 39, and the passage 37 has a valve seat 37a cooperating with the needle valve 40 to regulate admission of fuel into the valve chamber. The needle valve 40 is regulated by the exteriorly projecting knurled disk 41 shown.

The valve casing 36 has an intermediate upwardly projecting boss 42 into which is threaded the lower end of a tubi-form air and gas mixing chamber-providing member 43. The upper end of mixing chamber-providing member 43 carries the burner 18. The mixing chamber 43a of member 43 has the air-admission opening 44 to supply the proper amount of air for mixture with the gas supplied to burner 18. Gas communication from the valve chamber 39 to the tube provided mixing chamber 43a is had through a very small orifice 45a in the partition 46 in member 43 at the lower end of mixing chamber 43a. Thus gas pressure builds up in valve chamber 39 in poportion to the degree that valve 40 is moved away from its seat 37a. Therefore, it will be seen that I am able to dispense with the usual pressure regulator and thus economize both as to space and cost.

As will be appreciated, the tank and housing-provided chamber 10x furnishes a protected area for the valve casing 36 and related parts while rendering same easily accessible.

Having thus described my invention, what I claim is:

1. In a portable vapor fuel-burning stove providing an elongated substantially cylindrical tank, a casing-like housing of rectangular cross-section and of a length substantially greater than the length of said fuel tank and frictionally receiving the latter, said housing providing a tank-insertion opening at one end and providing top, bottom and side walls in addition to a rear end wall; said rear end wall of the housing constituting a rear tank end-engaging stop to limit insertion of the tank into the housing and to provide a chamber between the forward tank end and the open end of said housing, the top housing wall providing an opening communicating with said chamber, a valve casing removably carried by the forward end of said tank and having communicating fuel inlet and outlet passages of which the former is open to said tank, a valve in said valve casing and controlling the fuel flow to said outlet passage, a control member operatively connected to said valve and located exteriorly of said valve casing, a burner, a burner-supporting fuel supply pipe supported by said valve casing and communicating with said outlet passage, the outer burner-supporting portion of said pipe extending in a direction substantially normal to the axis of said cylindrical tank; at least the valve casing, valve control member and the major portion of said pipe including the burner-adjacent portion thereof being housed in said housing chamber to be protected by adjacent housing walls, the top, side and bottom walls of said housing making tangential frictional engagement with opposed tank wall portions whereby to prevent undesired relative shifting of the tank and housing and to provide upper and lower tank and housing wall defined compartments at each side of the tank and opening into said chamber, the frictional engagement of said fuel tank and housing wall portions maintaining the burner in predetermined relationship to said top housing wall opening, the aforementioned compartments above and below the housing side wall-engaging tank portions providing pigeon-hole like implement-receiving storage spaces, a heat user support extending above and carried by the housing top wall about said opening, and a ventilated closure for the open end of said housing and providing access to said valve control member and compartments.

2. In a portable vapor fuel-burning stove providing an elongated fuel tank, a casing-like housing of rectangular cross-section and of a length substantially greater than the length of said fuel tank and frictionally receiving the latter, said housing providing a tank insertion opening at one end and providing top, bottom and side walls in addition to a rear end wall; said rear end wall of the housing constituting a rear tank end-engaging stop to limit insertion of the tank into the housing and to provide a chamber between the forward tank end and the open end of said housing, the top housing wall providing an opening communicating with said chamber, a valve casing removably carried by the forward end of said tank and having communicating fuel inlet and outlet passages of which the former is open to said tank, a valve in said valve casing and controlling the fuel flow to said outlet passage, a control member operatively connected to said valve and located exteriorly of said valve casing, a burner, a burner-supporting fuel supply pipe supported by said valve casing and communicating with said outlet passage, the outer burner-supporting portion of said pipe extending in a direction substantially normal to the axis of said cylindrical tank; at least the valve casing, valve control member and the major portion of said pipe including the burner-adjacent portion thereof being housed in said housing chamber to be protected by adjacent housing walls, the tank providing top, bottom and side walls having intermediate longitudinally coextensive portions frictionally engaging opposed intermediate housing wall portions whereby to prevent undesired relative shifting of the tank and housing, the portions of said tank walls which adjoin said intermediate housing wall engaging portions being inclined away from opposed housing wall portions whereby to cooperate with the latter to provide top and bottom compartments at opposite sides of the tank and opening into said chamber, the frictional engagement of said fuel tank and housing wall portions maintaining the burner in predetermined relationship to said top housing wall opening, and the aforementioned compartments above and below the housing side wall-engaging tank portions providing implement-receiving storage compartments.

3. The structure of claim 2, and a top wall-reinforcing heat user support extending about said opening, and a ventilated closure for the open end of said housing and providing access to said valve control member and compartments.

(References on following page)

References Cited in the file of this patent

UNITED STATES PATENTS

| | | | |
|---|---|---|---|
| 1,160,894 | High | Nov. 16, | 1915 |
| 1,448,900 | Moats | Mar. 20, | 1923 |
| 1,580,909 | Lavoie | Apr. 13, | 1926 |
| 2,093,591 | Schneider | Sept. 21, | 1937 |
| 2,465,643 | Goss | Mar. 29, | 1949 |
| 2,497,321 | Pattinson et al. | Feb. 14, | 1940 |
| 2,666,480 | Peterson | Jan. 19, | 1954 |
| 2,707,416 | Smott | May 3, | 1955 |

FOREIGN PATENTS

| | | | |
|---|---|---|---|
| 825,296 | France | Dec. 8, | 1937 |
| 354,245 | Italy | Nov. 16, | 1937 |